(12) United States Patent
Röck et al.

(10) Patent No.: US 6,312,186 B1
(45) Date of Patent: Nov. 6, 2001

(54) FASTENING DEVICE

(75) Inventors: Erich Röck, Höchst (AT); Horst Hörger, Sontheim (DE)

(73) Assignee: Julius Blum Gesellschaft m.b.H., Höchst (AT)

( * ) Notice: Subject to any disclaimer, the term of this patent is extended or adjusted under 35 U.S.C. 154(b) by 0 days.

(21) Appl. No.: 09/246,814

(22) Filed: Feb. 9, 1999

(30) Foreign Application Priority Data

Feb. 9, 1998 (AT) .................................................. A 225/98

(51) Int. Cl.⁷ ...................................................... B25G 3/00
(52) U.S. Cl. ......................... 403/353; 211/182; 312/217; 312/222
(58) Field of Search ............................ 403/353; 312/217, 312/218, 222, 228.1, 227; 211/182, 189

(56) References Cited

U.S. PATENT DOCUMENTS

| | | | |
|---|---|---|---|
| 3,042,221 | * | 7/1962 | Rasmussen ............................ 211/182 |
| 3,096,108 | * | 7/1963 | Baybarz ............................... 211/189 |
| 3,159,440 | * | 12/1964 | Courtwright . |
| 3,360,321 | * | 12/1967 | Novales . |
| 3,392,848 | * | 7/1968 | McConnell et al. . |
| 4,425,013 | * | 1/1984 | Killen .................................. 312/216 |
| 4,429,930 | * | 2/1984 | Blouin ................................. 312/216 |
| 4,671,481 | * | 6/1987 | Beard . |
| 5,611,637 | * | 3/1997 | Brustle et al. . |
| 5,624,045 | * | 4/1997 | Highsmith et al. . |
| 5,758,988 | * | 6/1998 | Theodorou ........................... 211/182 |
| 5,858,509 | * | 1/1999 | Polch et al. . |

FOREIGN PATENT DOCUMENTS

| | | |
|---|---|---|
| 352 326 | 9/1979 | (AT) . |
| 352326 * | 9/1979 | (DE) . |
| 1434130 * | 5/1976 | (GB) . |

* cited by examiner

Primary Examiner—Lynne H. Browne
Assistant Examiner—Tomlyne Malcolm
(74) Attorney, Agent, or Firm—Wenderoth, Lind & Ponack, L.L.P.

(57) ABSTRACT

A fastening device for the fastening of a plurality of furniture fittings to a furniture part includes an anchoring rail which is to be fastened to a side wall of a piece of furniture and has lateral openings for receiving fastening pins of the fastening device has a locking rail (10, 19) which is complementary to the and is displaceable relative to the anchoring rail while advantageously being guided therein and which has edge portions which latch in behind projections of the fastening pins in a locked position. The locking rail is movable by way of an eccentric mounted in the anchoring rail rail.

56 Claims, 14 Drawing Sheets

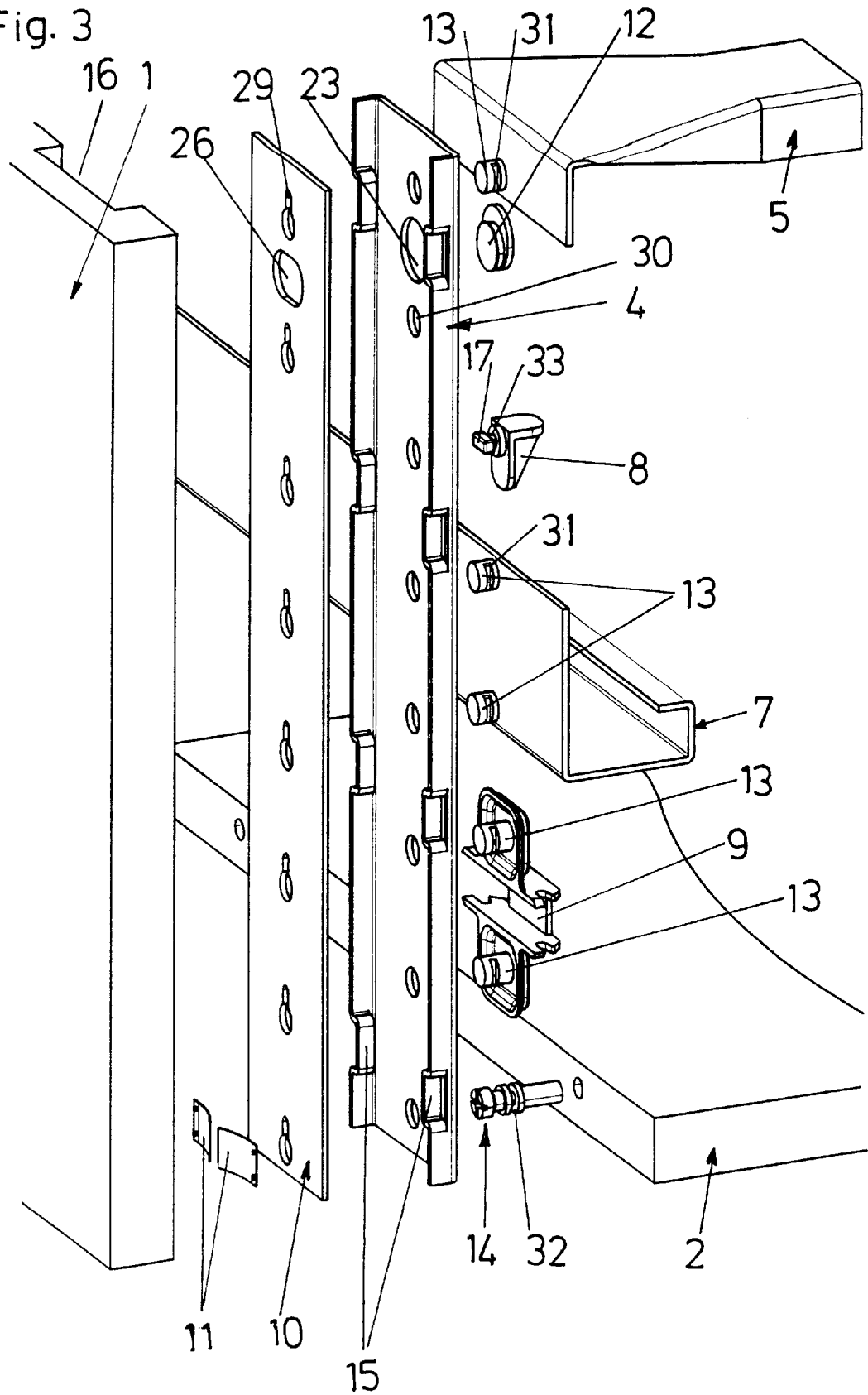

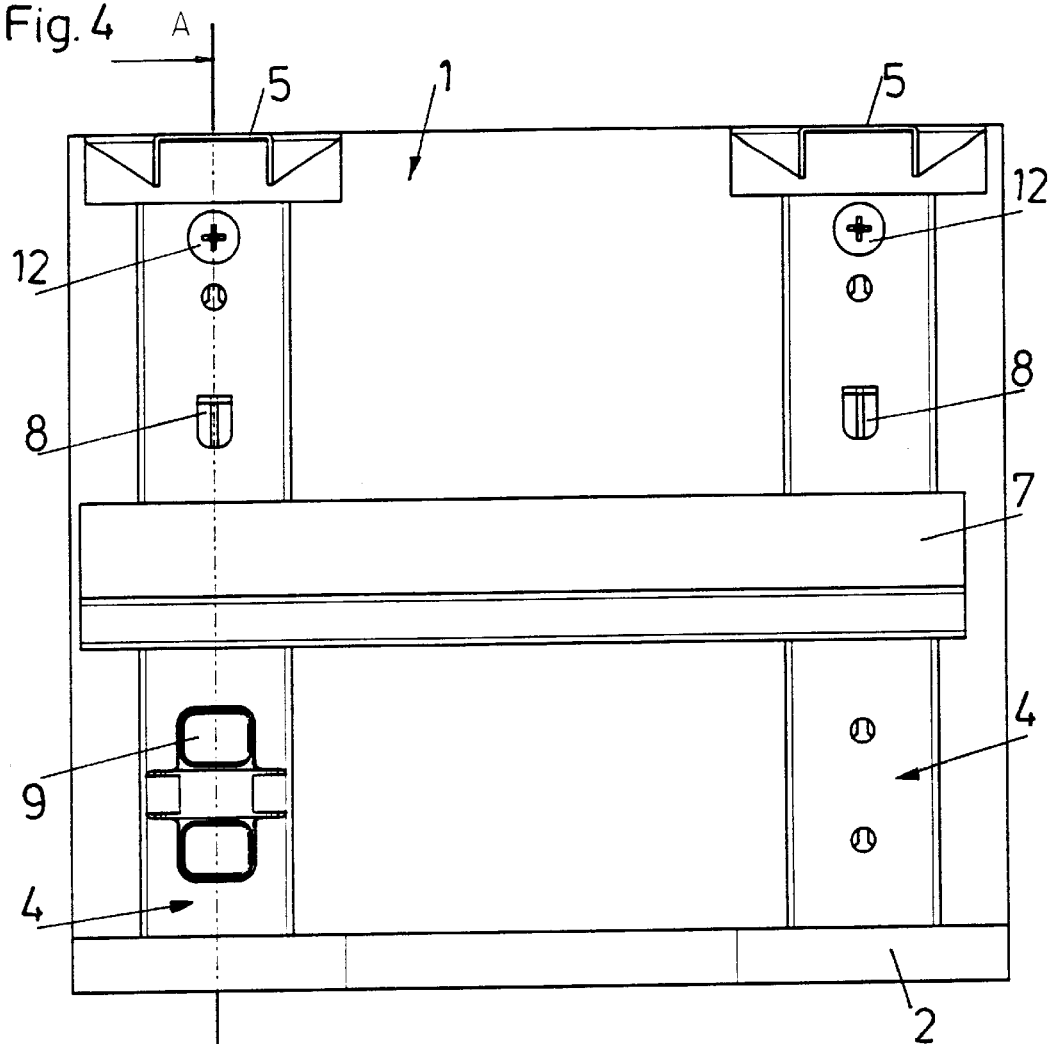
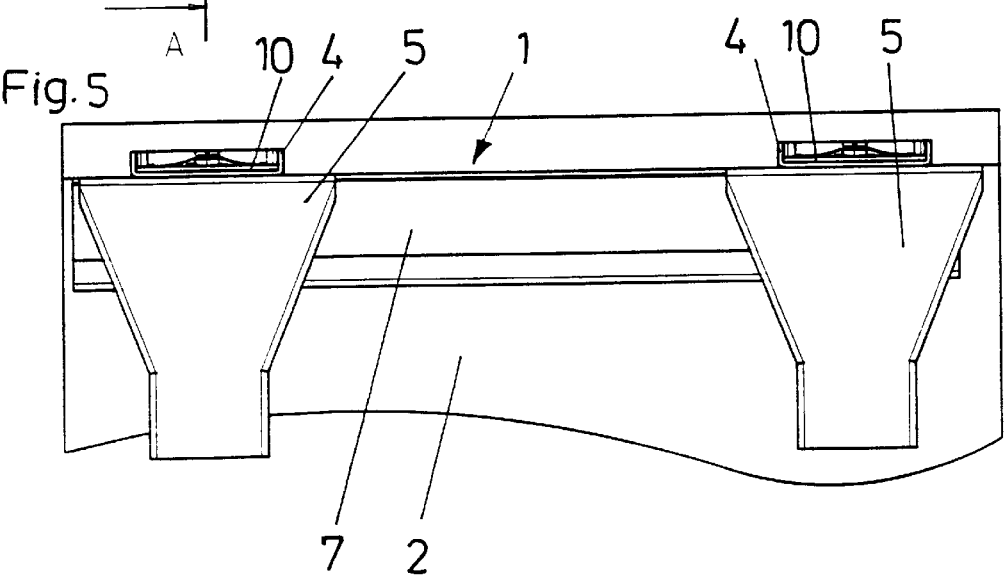

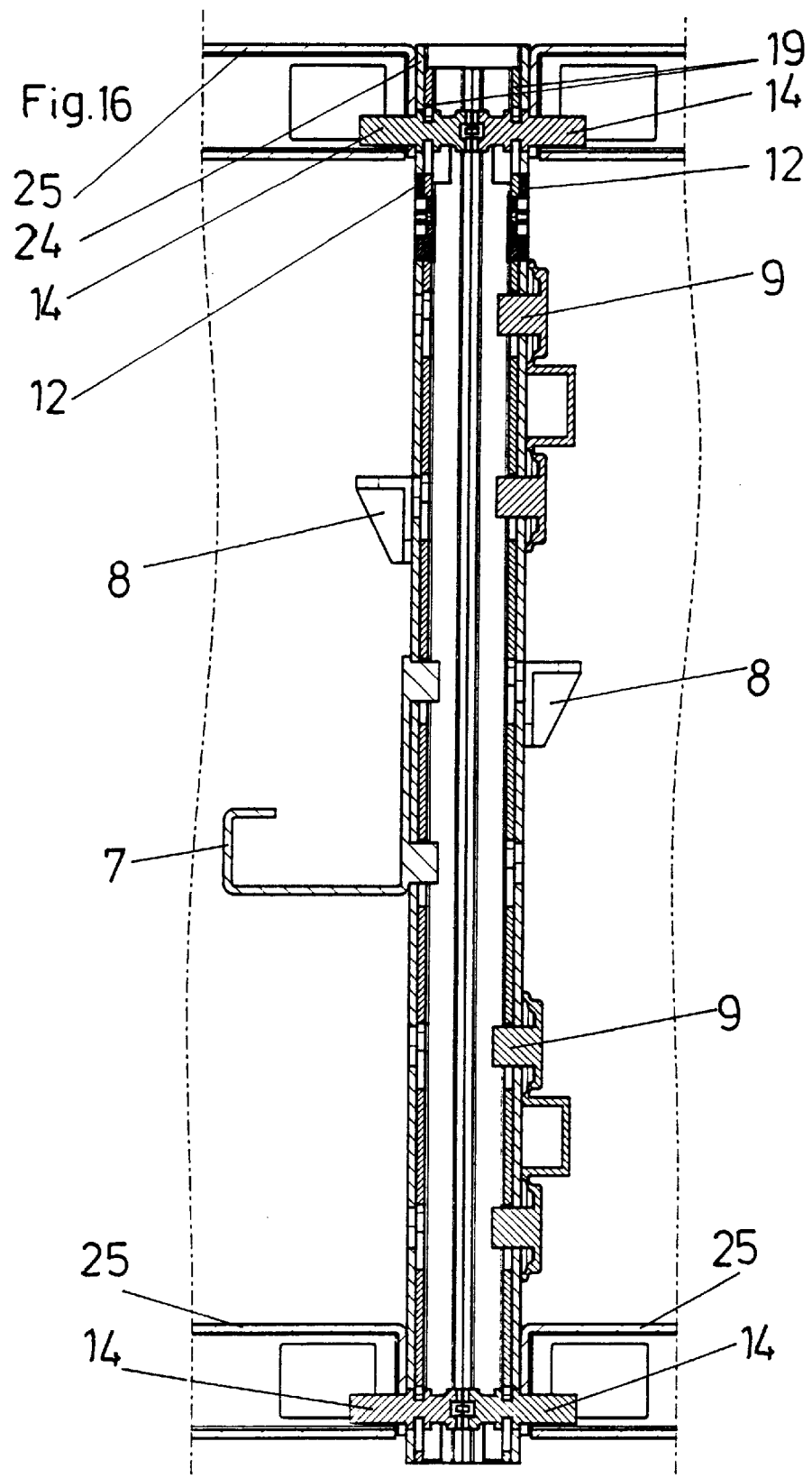

FASTENING DEVICE

BACKGROUND OF THE INVENTION

1. Field of the Invention

The invention relates to a fastening device for the fastening of a plurality of furniture fittings to a furniture part and including an anchoring rail which is to be fastened to a side wall of a piece of furniture and has openings for receiving fastening pins of the fittings.

2. Description of the Prior Art

According to the current state of the art, the individual furniture fittings of a cabinet are fastened individually by means of pegs or the like. Examples of these are base plates of hinges, furniture connectors, shelf holders and the like. It is also known to connect side walls of a cabinet to a top and a bottom thereof by means of special connecting fittings.

The object of the invention is to provide a fastening device by means of which the assembly of a piece or article or furniture can be considerably sped up. In this regard, the furniture fittings, for example base plates of hinges, are not to be fixed individually by tightening pegs or screws, but rather it is to be possible to position all the fittings, arranged one above the other in the finished cabinet, on one side on the wall of the piece or furniture, onto a base body of the fastening device and subsequently to fix all the furniture fittings in a single operation.

From AT patent 352 326 it is known to fix furniture fittings by means of a rail which is inserted into a groove in the wall of the piece of furniture. However, the fittings are fastened individually, it being necessary, in the case of the base plate of a hinge for example, to actuate two spreading or locking elements.

U.S. Pat. No. 4,671,481 describes a fitting for fastening a work surface to a wall of a piece of furniture, it being possible to hang a fitting part provided with hooks onto a rail which can be fastened to the wall of the piece of furniture having a plurality of slots. GB 14 34 130 A discloses the anchoring of side walls of a piece of furniture to supports by means of a strip-shaped fitting having projections which are insertable into slots of a post constructed on the side wall of the piece of furniture. In both cases, the projections of one fitting are inserted into the slotted rail or post and anchored by a relative displacement, which means that during assembly the two furniture parts and the fitting part have to be offset relative to one another. In this case, such fittings can only be used with great difficulty, if at all, when a plurality of parts are to be connected to one another by means of these fittings, possibly in different operations.

SUMMARY OF THE INVENTION

The object according to the invention is achieved by provision of at least one locking rail which is complementary to an anchoring rail and is displaceable relative to the anchoring rail and which has edge portions which latch in behind projections of fastening pins in a locking position.

Advantageously the locking rail is guided within the anchoring rail.

Advantageously, there is provision for the locking rail to be displaceable in the longitudinal direction of the anchoring rail and for both rails to be of approximately equal length. The displacement of the locking rail is effected advantageously by an eccentric mounted in the anchoring rail.

Advantageously, the locking rail is provided with keyhole-shaped holes.

When the fittings are positioned on the anchoring rail, their fastening pins project through larger regions of the keyhole-shaped holes of the locking rail. When the locking rail is displaced relative to the anchoring rail by a single rotation of the eccentric, the fastening pins are received in narrower parts of the keyhole-shaped holes and fixed by edge portions of the anchoring rail. Thus, all the fittings of one row of a side wall of the piece of furniture are fixed by a single rotation of the eccentric. It is possible here to fix base plates of hinges, furniture connectors connecting the side wall to the top and bottom, as well as shelf holders and the like.

DESCRIPTION OF THE DRAWING

Various exemplary embodiments of the invention are described below with reference to the figures of the accompanying drawings, in which:

FIG. 3 shows an exploded diagram of a fastening device as well as a part of the side wall of the piece of furniture, and the fittings to be fastened;

FIG. 4 shows an elevation of a side wall with fastening devices according to the invention;

FIG. 5 shows a plan view of a side wall with fastening devices according to the invention;

FIG. 16 shows a vertical section through a fastening device according to the exemplary embodiment of FIG. 14.

DESCRIPTION OF THE PREFERRED EMBODIMENTS

Figure 1:
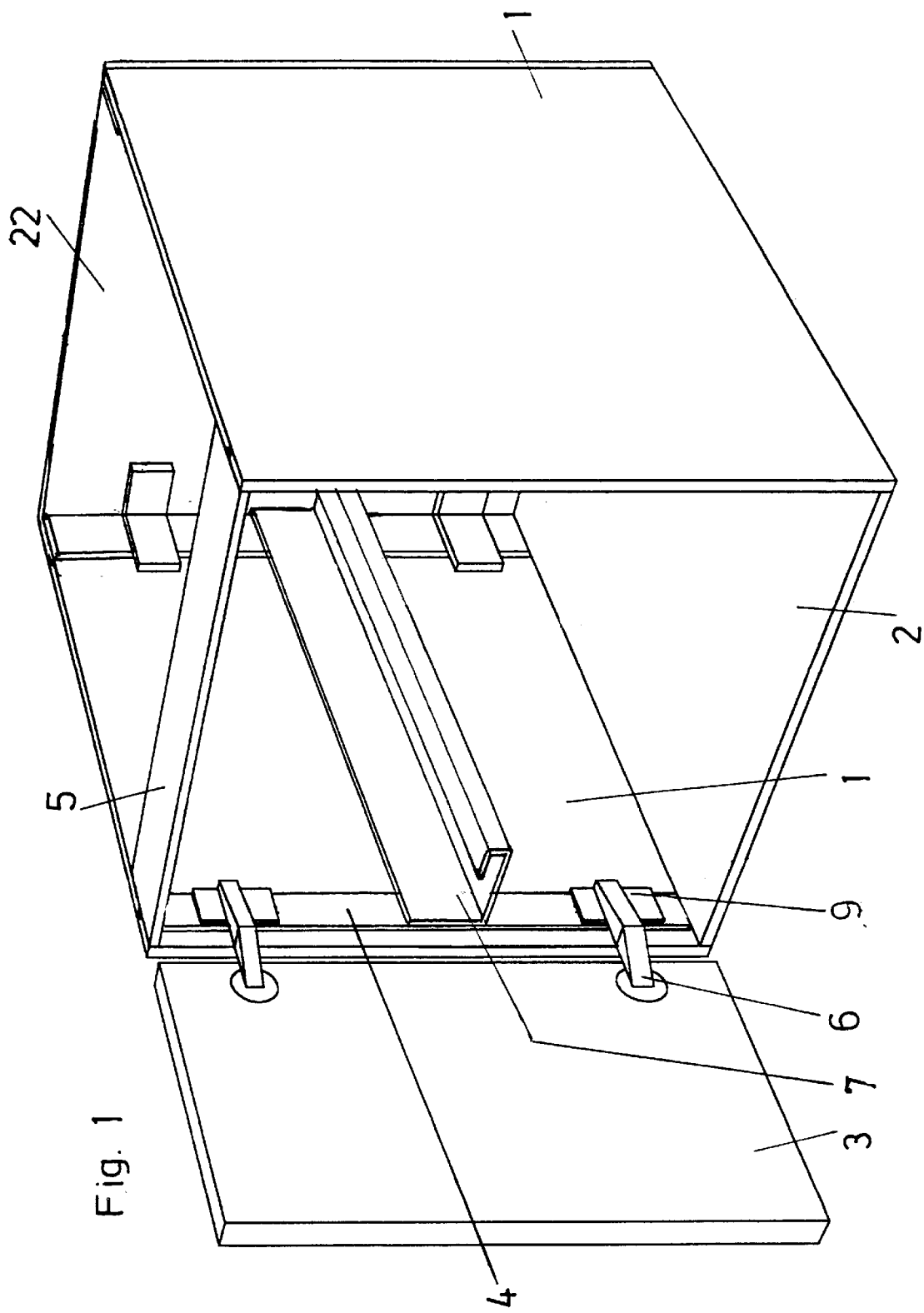
FIG. 1 shows a schematic diagram of a piece of cabinet-type furniture provided with fastening devices according to the invention.
Figure 2:
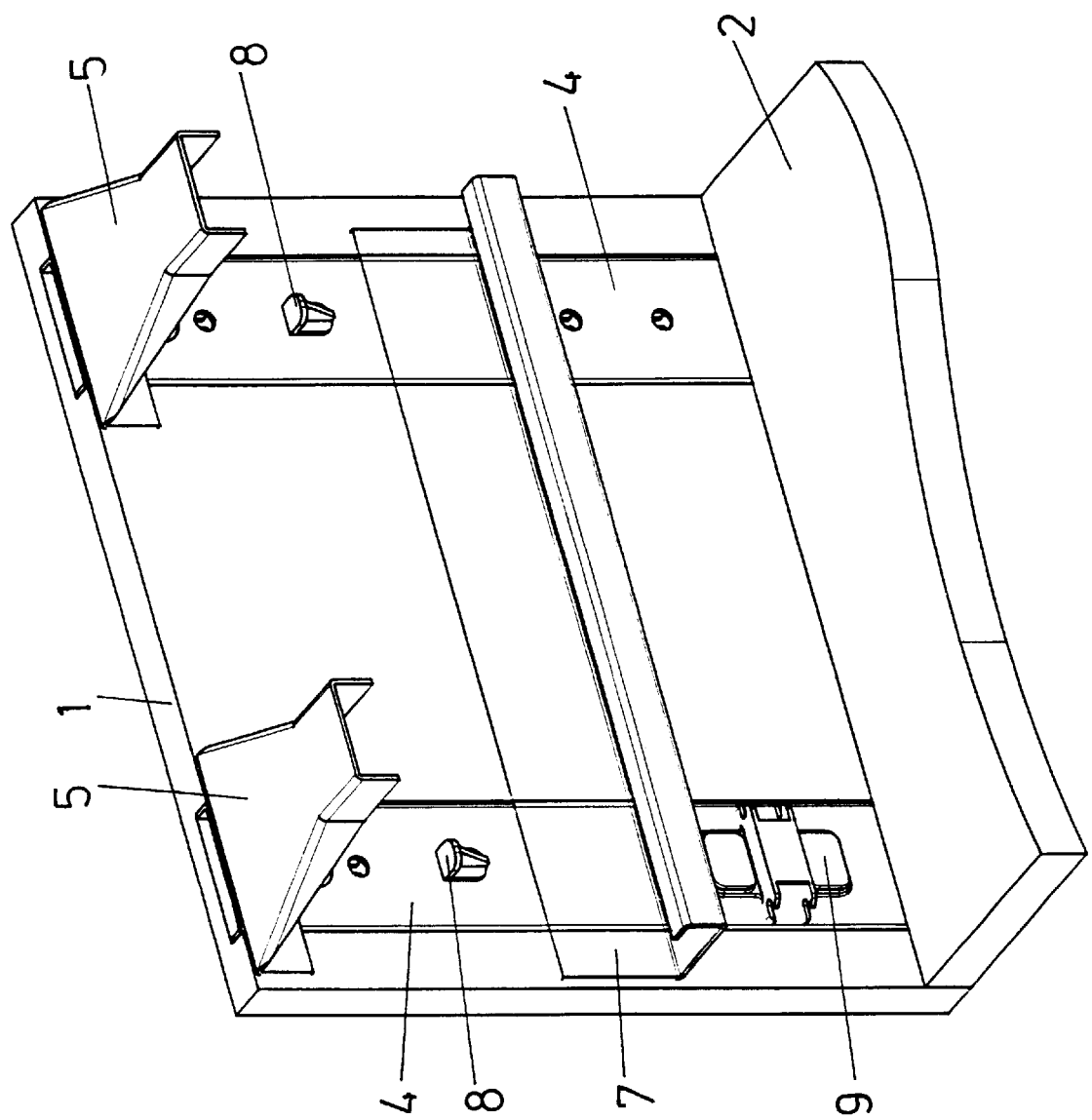
FIG. 2 shows a schematic diagram of a side wall of the piece of furniture with fittings and fastening devices according to the invention.
Figure 6:
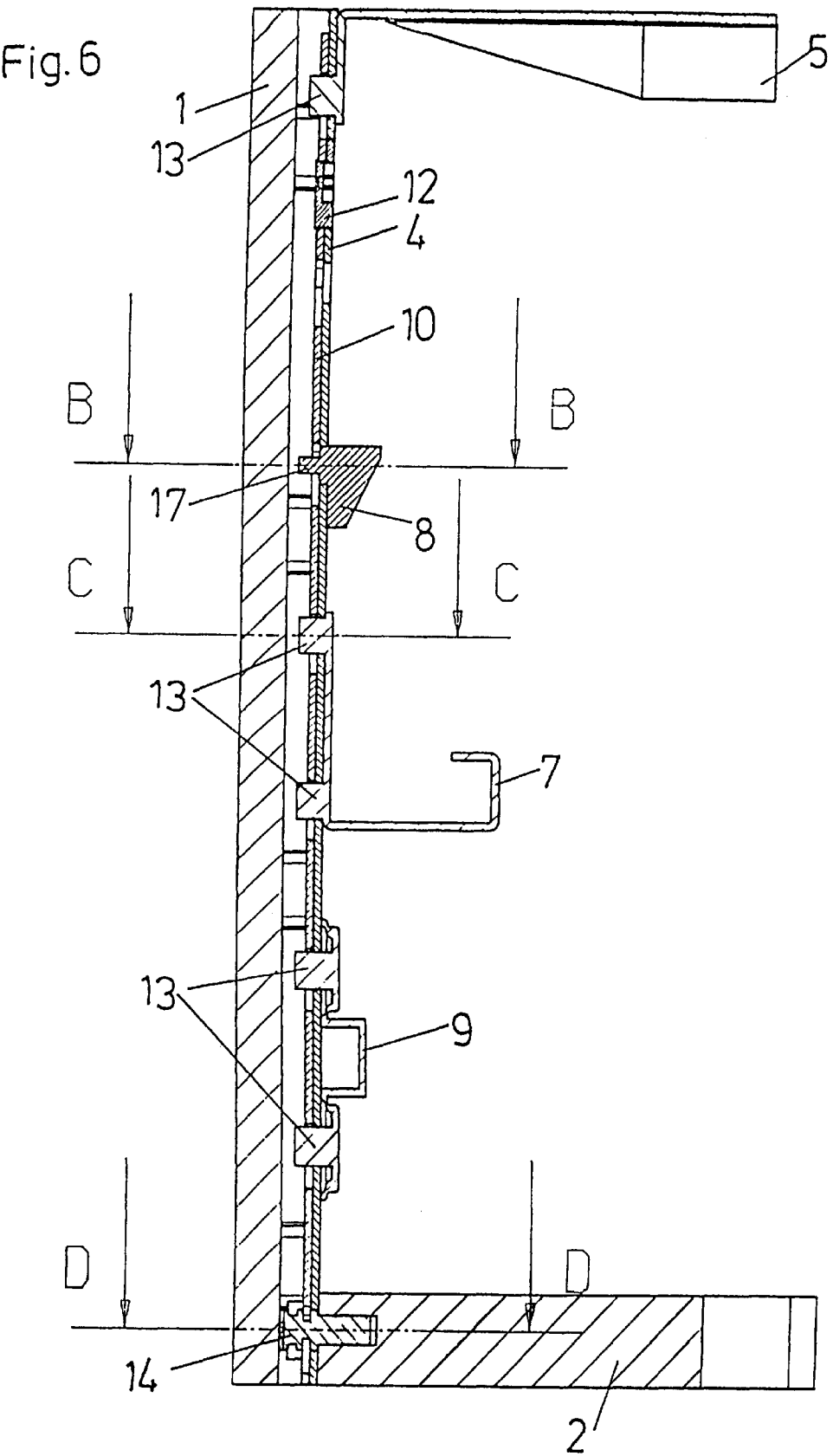
FIG. 6 shows a section along the line A—A of FIG. 4.
Figure 8:
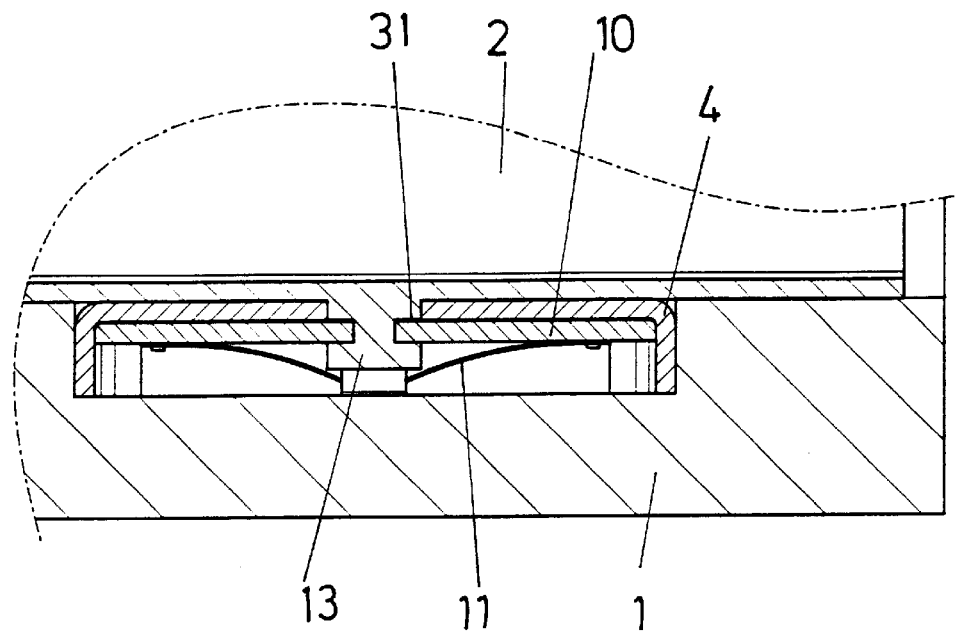
FIG. 8 shows a section along the line C—C of FIG. 6.
Figure 7:
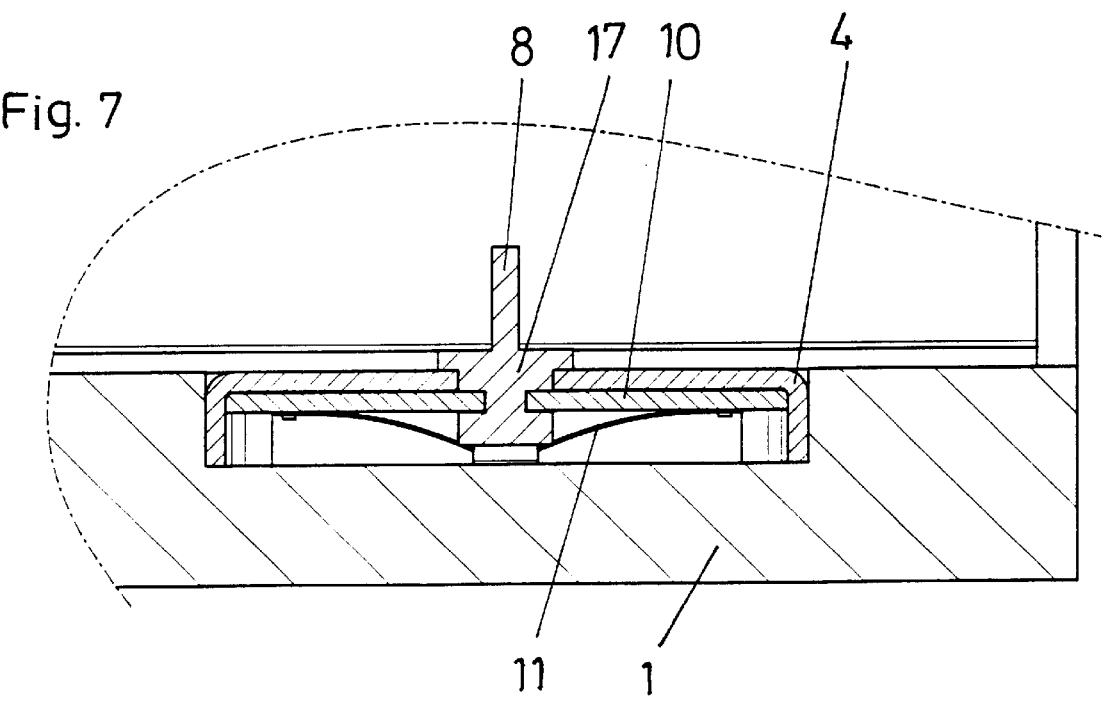
FIG. 7 shows a section along the line B—B of FIG. 6.

The piece of box-type furniture shown in FIG. 1 has side walls 1 which are connected by means of fastening devices according to the invention to the bottom 2, crossmembers 5, a rear wall 22 and, by way of hinges 6, to the door 3 of the piece of furniture.

The side walls 1 have vertical grooves 16 on the inside (FIG. 3), at the front and rear, in which anchoring rails 4, 10 of the fastening devices are received. Each fastening device has an anchoring rail 4 with a U profile, and a flat locking rail 10 which is guided in the profile of the anchoring rail 4.

The anchoring rail 4 is provided at its lateral webs with inwardly directed indentations 15 which form a guide for the locking rail 10.

Furthermore, the anchoring rail 4 has first holes 30 which permit the passage of fastening pins 13, 14, 17.

The locking rail 10 is provided with corresponding second holes 29 which are designed in the shape of keyholes. The fastening pins 13, which are arranged on the crossmembers 5, supporting rails 7 of a drawer guide assembly or base plates 9 of the hinges 6, are pushed through the holes 30 and the wider regions of the keyhole-shaped holes 29, as are the fastening pins 17 of shelf support 8 or the fastening pins 14, the latter being constructed as furniture connectors and being screwed or pegged into the bottom 2. When all the fittings are mounted, the locking rail 10 is displaced vertically relative to the anchoring rail 4 by means of eccentric 12 which is received in a hole 23 of the anchoring rail 4 and projects into a horizontally elongated hole 26 of the locking rail 10. As a result, the fastening pins 13, 14, 17 are moved into the narrower region of the keyhole-shaped holes 29, the edge regions of the holes 29 or of the locking rail 10 latching respectively into grooves 31 and undercuts 32, 33 of the fastening pins 13, 14, 17.

All the members 7, 8, 9, as well as the crossmembers 5 and the bottom 2, are thus locked to the rails 4, 10 by a single operation.

In the exemplary embodiment shown, the grooves 31 on the fastening pins 13 are arranged laterally and undercut 32 of the fastening pin 14 is an annular groove. The fastening pin 17 is of hammer-shaped construction, the locking rail 10 latching by the edge of a keyhole-shaped hole 29 into the undercut 33 which is delimited by the head and the neck of the fastening pin 17.

Figure 9:
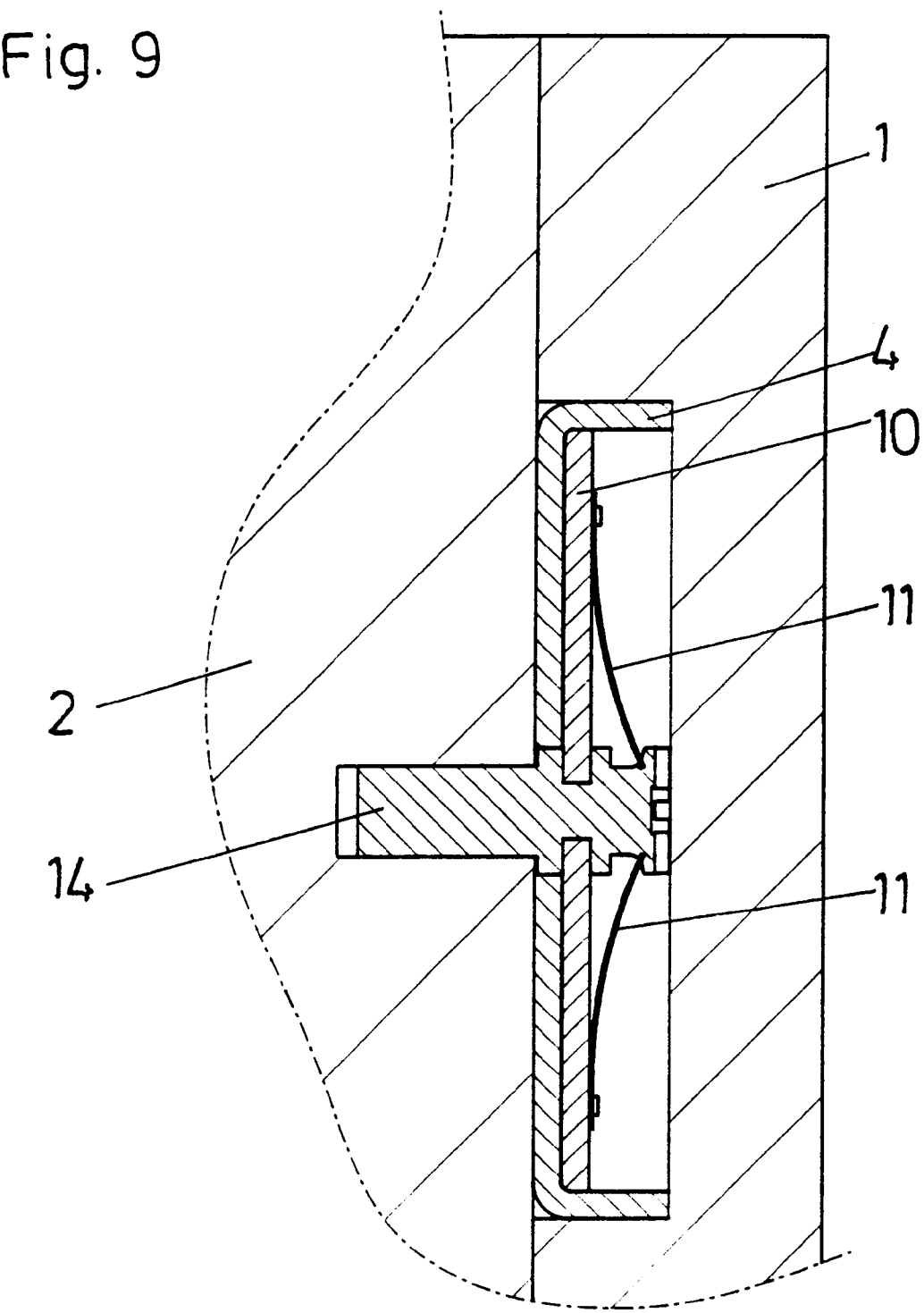
FIG. 9 shows a section along the line D—D of FIG. 6.

In the exemplary embodiment, there are additionally provided leaf springs 11 which are fastened to the locking rail 10. The leaf springs 11 can be fastened to the locking rail 10 at a plurality of locations along the length of the locking rail 10. As shown in FIGS. 3 and 9, the leaf springs 11 are riveted to the locking rail 10 and engage on the head of the fastening pin 14, with the result that the fastening pin 14 is drawn into the profile of the anchoring rail 4 and the side wall 1 is pressed against the bottom 2.

Figure 10:
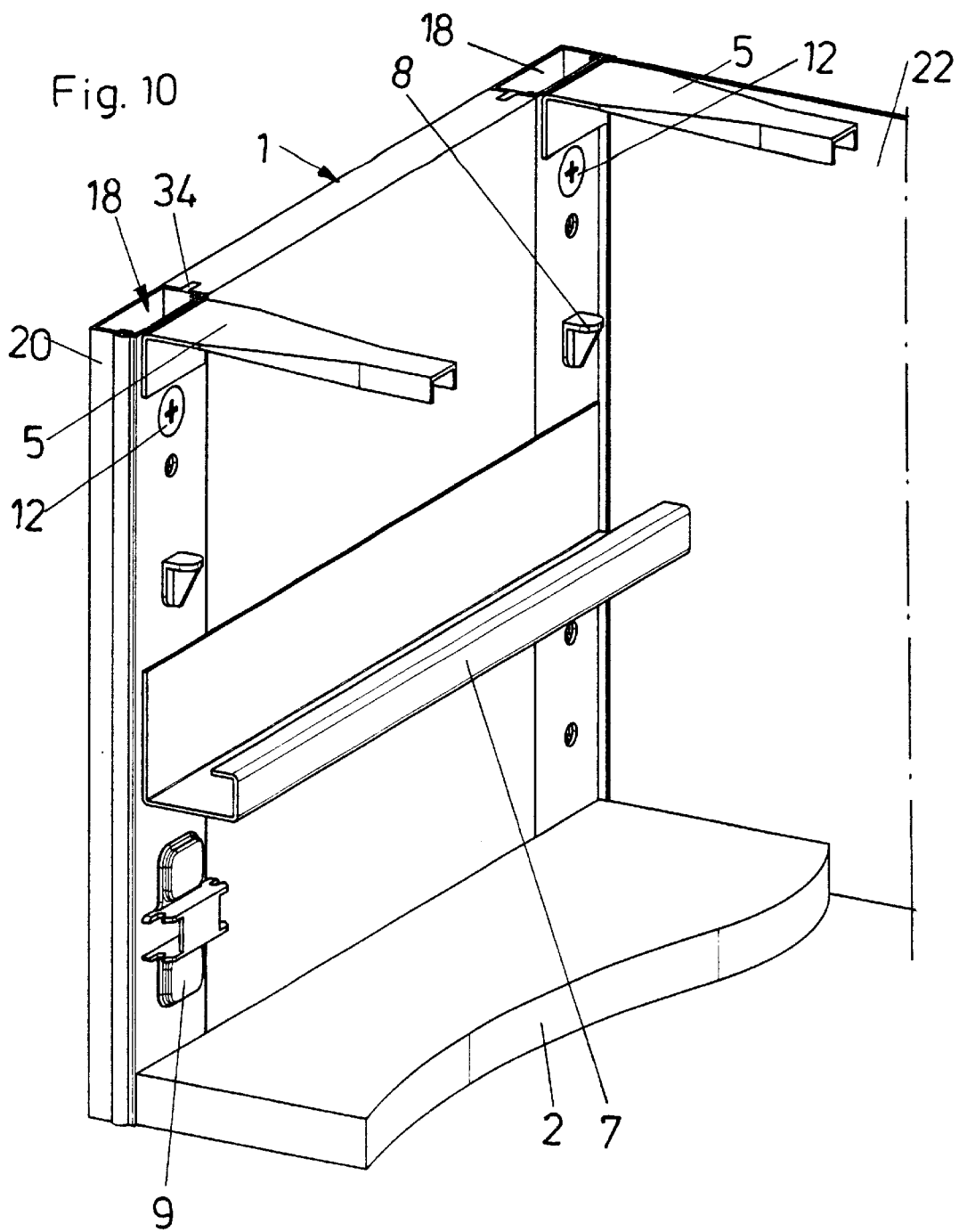
FIG. 10 shows a diagram of a side wall of a piece of furniture with fastening devices according to in a further exemplary embodiment of the invention and with the fittings held thereon.
Figure 11:
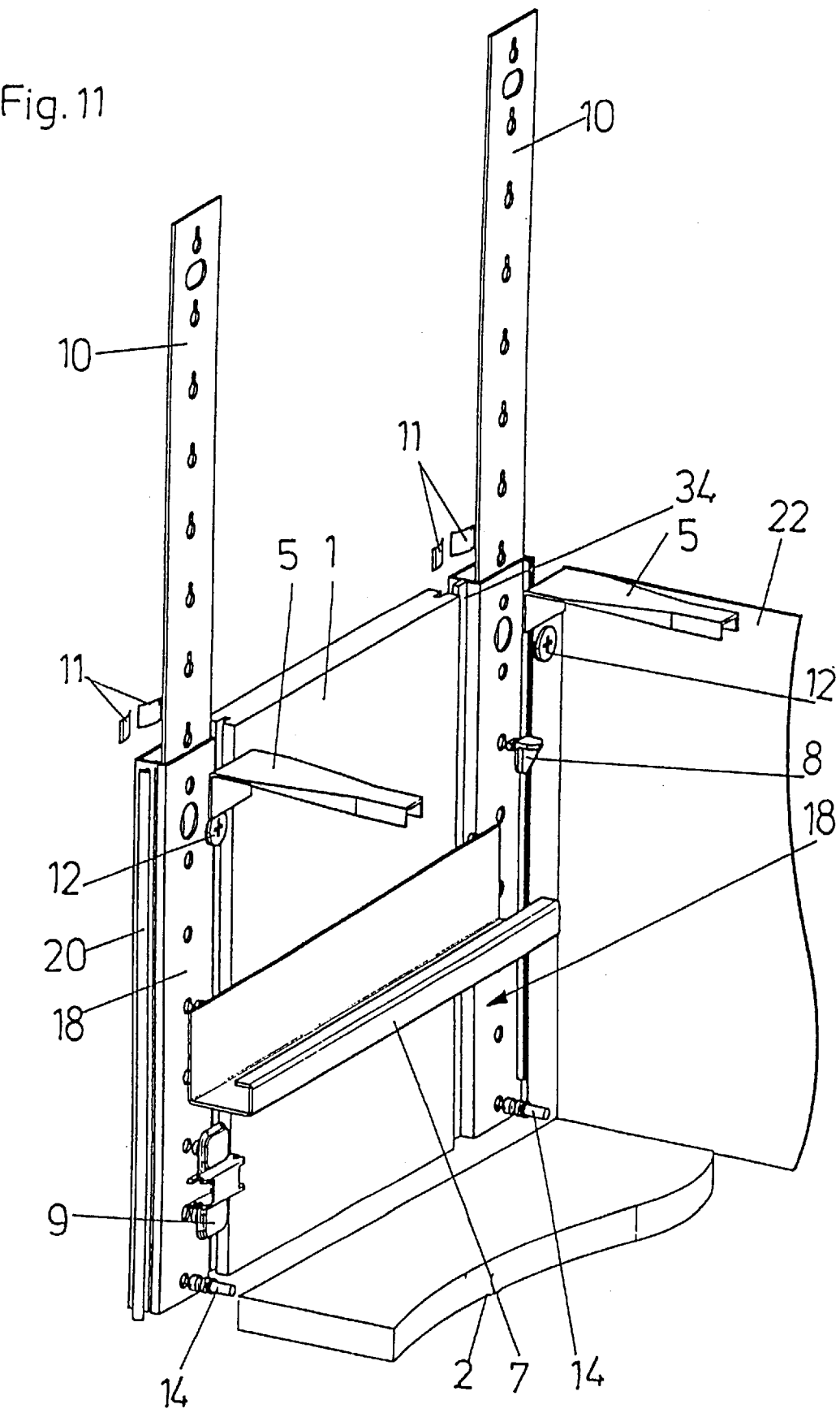
FIG. 11 shows the same view as FIG. 10 except that the individual parts are drawn in an exploded view.
Figure 12:
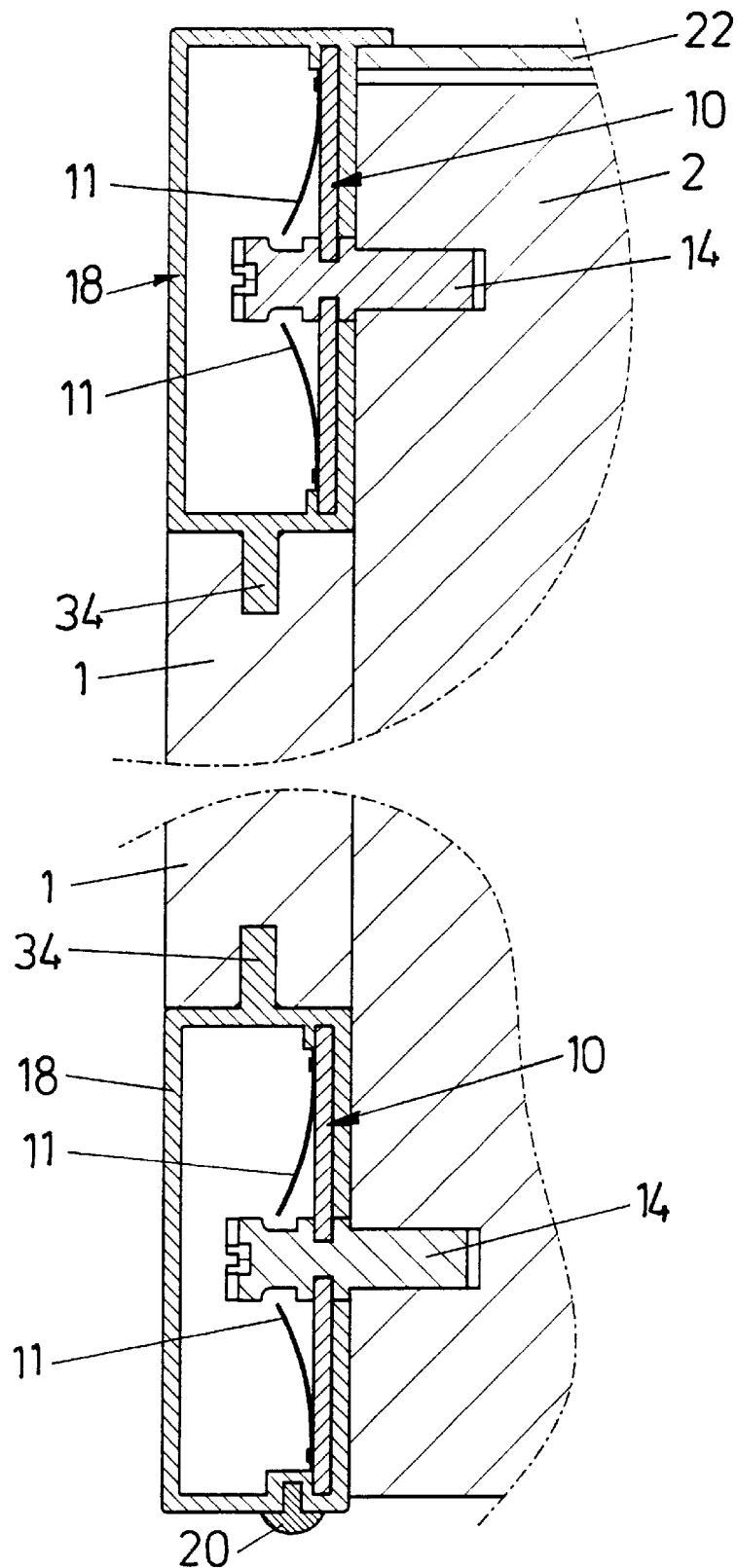
FIG. 12 shows a horizontal section through a wall of the piece of furniture and the fastening devices according to the invention as shown in FIG. 10.
Figure 13:
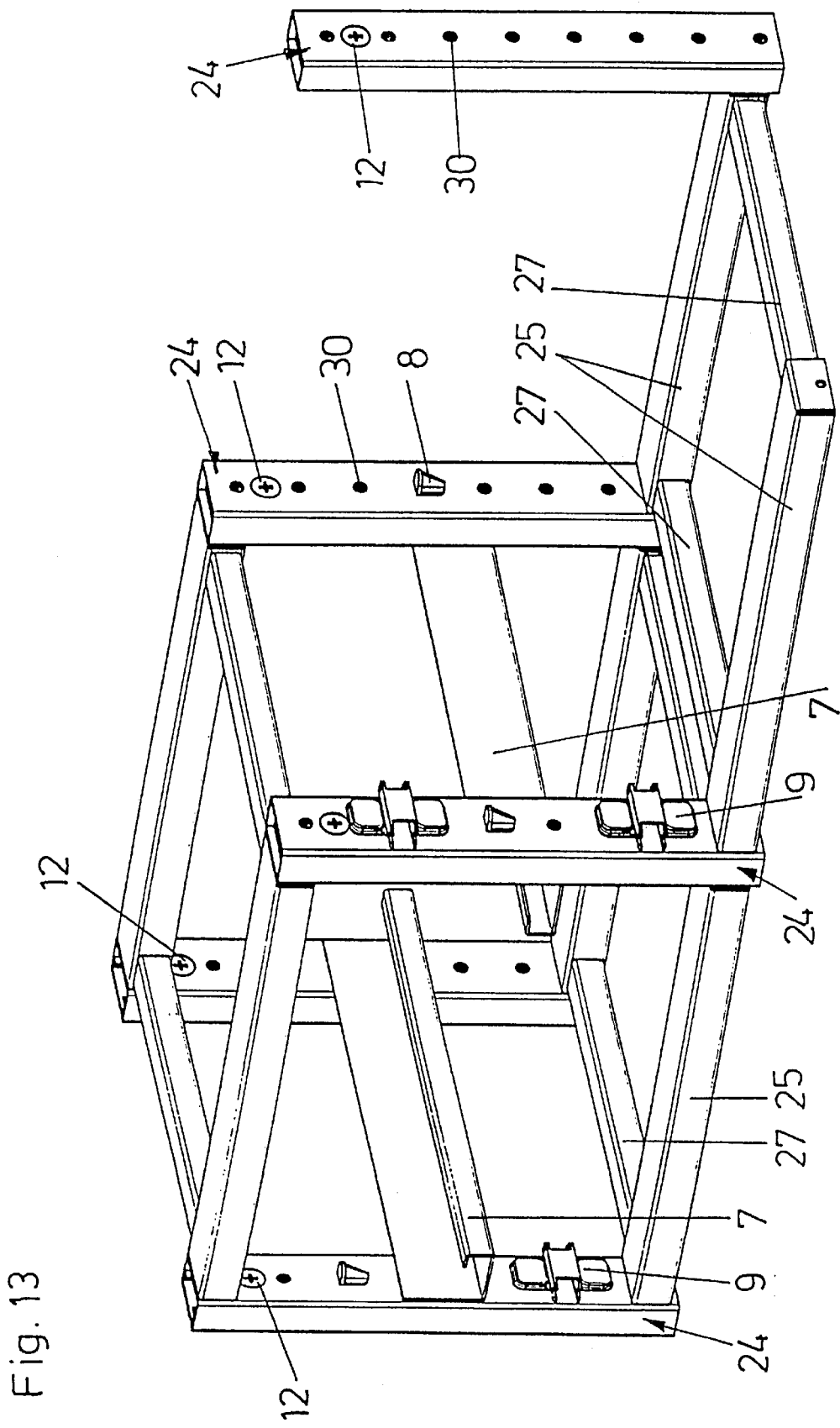
FIG. 13 shows a diagram of a framework, constructed by means of the fastening devices according to the invention, for a piece of cabinet-type furniture.

In the exemplary embodiment according to FIGS. 10 to 12, anchoring rails 18 are designed with box-shaped profiles of rectangular cross section. Each anchoring rail 18 has a laterally protruding web 34 which projects into a complementary groove on the end face of the side wall 1 of the piece of furniture. In this way, the anchoring rail 18 is anchored to the side wall 1. The web 34 may preferably have a fir-cone profile to create a better hold in the groove of the side wall 1 of the piece of furniture. The side wall 1 of the piece of furniture is preferably produced from a wood-based material, for example as a particle board.

In contrast to the previously described exemplary embodiment, in which the fastening devices are set into the side wall 1 of the piece of furniture, the anchoring rails 18 in the exemplary embodiment according to FIGS. 10 to 12 are joined onto the side wall 1 of the piece of furniture and therefore increase the depth of the entire side wall of the piece of box-type furniture.

The front anchoring rail 18 has at its side directed toward the door 3 a damping profile of configuration 20 made of plastic or rubber, against which the door 3 rests in the closed state.

The locking rail 10 is designed in the same way as in the previously described exemplary embodiment and is again actuated by way of an eccentric 12 which is received in a hole 23 of the anchoring rail 18. Likewise, the fastening pins 13, 14, 17 of the respective of the fittings and crossmembers 5 or the bottom 2 are of the same design, so that both systems (anchoring rail 4 or anchoring rail 18) can be easily exchanged at any time.

Figure 14:
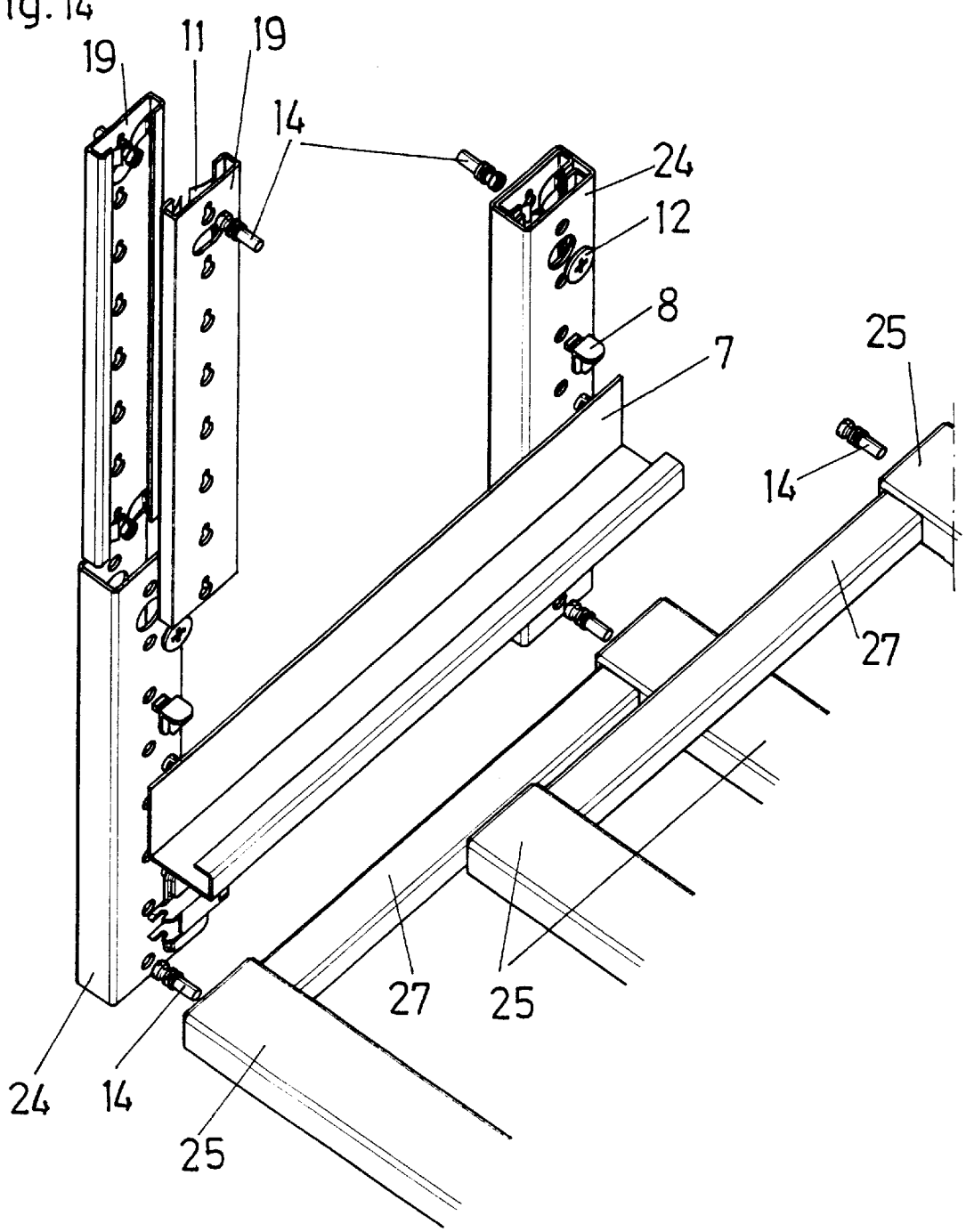
FIG. 14 shows a diagram of a further exemplary embodiment of the fastening device according to the invention.
Figure 15:
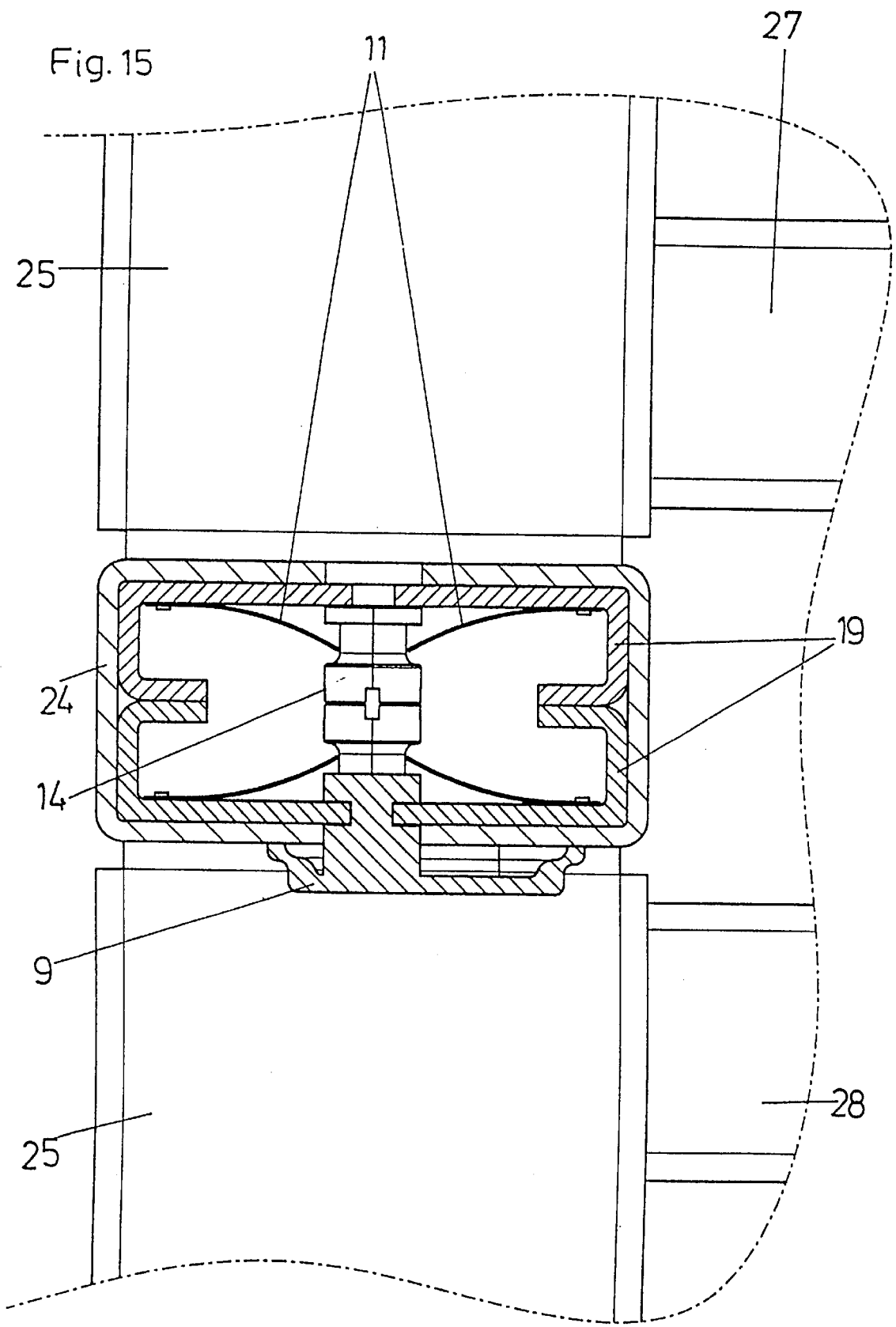
FIG. 15 shows a horizontal section through a fastening device according to FIG. 14.

In the exemplary embodiment according to FIGS. 14 to 16, anchoring rails 24 are again designed with a rectangular box-shaped profile.

In the exemplary embodiment shown, the anchoring rails 24 together with horizontal transverse profiles 25, 27 form a framework. However, they could also have lateral webs 34, as in the previously described exemplary embodiment, or other anchoring means, in order to be connected to a side wall 1 of a piece of furniture.

Two locking rails 19 are inserted into the anchoring rails 24. The locking rails 19 each have a C-shaped profile, the lateral webs being directed toward each other. This means that the central webs of the locking rails 19, in which the keyhole-snaped holes 29 are formed, rest against the broader webs of the anchoring rails 24 having the holes 30 for the fastening pins 13, 14, 17.

It is thus possible to fasten both fittings 7, 9 and crossmembers 25, 27 to two sides of the anchoring rails 24, so that these anchoring rails 24 are particularly suitable for the construction of partitions.

The vertical displacement of the anchoring rail 19 is again effected by way of the eccentric 12, there being provided in each anchoring rail 24 two eccentrics 12 at two mutually opposite sides.

The C-shaped locking rails 19 are again provided with leaf springs 11 (advantageously the leaf springs 11 are riveted to the locking rails 19) which press on the heads of the fastening pins 14 for the crossmembers 25 and thus draw the crossmembers 25 and the anchoring rails 24 together. It is thereby ensured that, upon actuation of the eccentrics 12, the locking rails 19 in each case latch into the annular grooves 32 of the fastening pins 14.

Just as all the fittings 7, 6, 9 or connecting parts are locked by a single rotation of the eccentric 12, they are also released simultaneously by a rotation of the eccentric 12 in the opposite direction, so that it is very easy to exchange fittings and the like.

What is claimed is:

1. A furniture fastening assembly comprising:
   a plurality of furniture fittings including respective fastening pins having projections;
   an anchoring rail to be fastened to an article of furniture, said anchoring rail having therein a plurality of first holes to receive therein said fastening pins;
   a locking rail complementary to said anchoring rail and displaceable relative thereto between an unlocking position and a locking position, said locking rail having therein a plurality of second holes to receive therein said fastening pins, said locking rail having edge portions partially defining said second holes; and
   wherein when each said fastening pin is inserted through a respective said first hole and a respective corresponding said second hole, said locking rail is displaceable to said locking position whereat said edge portions fit behind said projections and lock said furniture fittings in position relative to said anchoring rail, with each said fastening pin being selectively positioned over a length of said anchoring rail and a length of said locking rail such that each fastening pin is also insertable through any other of said first holes and through any other corresponding of said second holes to adjust a positional relationship of said plurality of furniture fittings relative to the length of said anchoring rail and the length of said locking rail.

2. An assembly as claimed in claim 1, wherein at least one of said furniture fittings is connected to a furniture part to be connected to the article of furniture.

3. An assembly as claimed in claim 1, wherein said locking rail fits within said anchoring rail.

4. An assembly as claimed in claim 3, wherein said locking rail is guided during displacement relative to said anchoring rail.

5. An assembly as claimed in claim 4, wherein said locking rail is guided by said anchoring rail.

6. An assembly as claimed in claim 5, wherein said anchoring rail has webs having inwardly directed indentations guiding said locking rail.

7. An assembly as claimed in claim 1, wherein said locking rail is guided during displacement relative to said anchoring rail.

8. An assembly as claimed in claim 1, wherein said locking rail is guided by said anchoring rail.

9. An assembly as claimed in claim 1, wherein said anchoring rail has webs having inwardly directed indentations guiding said locking rail.

10. An assembly as claimed in claim 1, wherein said edge portions fit into grooves formed in said fastening pins when said locking rail is in said locking position.

11. An assembly as claimed in claim 1, wherein said grooves are located laterally of said fastening pins.

12. An assembly as claimed in claim 1, wherein said locking rail is displaceable longitudinally relative to said anchoring rail.

13. An assembly as claimed in claim 1, wherein said locking rail and said anchoring rail have approximately equal lengths.

14. An assembly as claimed in claim 1, wherein said first holes are arranged in a row.

15. An assembly as claimed in claim 14, wherein said second holes are arranged in a row.

16. An assembly as claimed in claim 1, wherein said second holes are arranged in a row.

17. An assembly as claimed in claim 1, wherein said second holes are key-shaped.

18. An assembly as claimed in claim 17, wherein said edge portions define smaller portions of said key-shaped second holes.

19. An assembly as claimed in claim 1, wherein said anchoring rail has a U-shaped profile.

20. An assembly as claimed in claim 1, wherein said anchoring rail has a box-shaped profile.

21. An assembly as claimed in claim 1, wherein said locking rail has a C-shaped profile.

22. An assembly as claimed in claim 21, comprising two C-shaped locking rails having respective lateral webs and to be arranged in a profile of said anchoring rail with said respective lateral webs directed toward each other.

23. An assembly as claimed in claim 1, further comprising an eccentric mounted on said anchoring rail and having an eccentric surface acting on said locking rail to generate displacement of said locking rail relative to said anchoring rail.

24. An assembly as claimed in claim 1, wherein said locking rail has at least one spring to engage at least one said fastening pin.

25. An assembly as claimed in claim 1, wherein said anchoring rail has a lateral fastening web to be inserted into a groove in the article of furniture.

26. An assembly as claimed in claim 1, wherein said anchoring rail has a lateral damping member.

27. An assembly as claimed in claim 26, wherein said damping member is of plastic.

28. An assembly as claimed in claim 26, wherein said damping member is of rubber.

29. An assembly as claimed in claim 1, wherein at least one said furniture fitting comprises a cross strut having at opposite first and second ends thereof respective said fastening pins.

30. A fastening device for connecting a plurality of furniture fittings including respective fastening pins having projections, said fastening device comprising:

an anchoring rail to be fastened to an article of furniture, said anchoring rail having therein a plurality of first holes to receive therein the fastening pins;

a locking rail complementary to said anchoring rail and displaceable relative thereto between an unlocking position and a locking position, said locking rail having therein a plurality of second holes to receive therein the fastening pins, said locking rail having edge portions partially defining said second holes; and wherein when each fastening pin is inserted through a respective said first hole and a respective corresponding said second hole, said locking rail is displaceable to said locking position whereat said edge portions fit behind the projections and lock the furniture fittings in position relative to said anchoring rail, with each fastening pin being selectively positionable over a length of said anchoring rail and a length of said locking rail such that each fastening pin is also insertable through any other of said first holes and through any other corresponding of said second holes to adjust a positional relationship of the plurality of furniture fittings relative to the length of said anchoring rail and the length of said locking rail.

31. A fastening device as claimed in claim 30, wherein said locking rail fits within said anchoring rail.

32. A fastening device as claimed in claim 31, wherein said locking rail is guided during displacement relative to said anchoring rail.

33. A fastening device as claimed in claim 32, wherein said locking rail is guided by said anchoring rail.

34. A fastening device as claimed in claim 33, wherein said anchoring rail has webs having inwardly directed indentations guiding said locking rail.

35. A fastening device as claimed in claim 30, wherein said locking rail is guided during displacement relative to said anchoring rail.

36. A fastening device as claimed in claim 30, wherein said locking rail is guided by said anchoring rail.

37. A fastening device as claimed in claim 30, wherein said anchoring rail has webs having inwardly directed indentations guiding said locking rail.

38. A fastening device as claimed in claim 30, wherein said locking rail is displaceable longitudinally relative to said anchoring rail.

39. A fastening device as claimed in claim 30, wherein said locking rail and said anchoring rail have approximately equal lengths.

40. A fastening device as claimed in claim 30, wherein said first holes are arranged in a row.

41. A fastening device as claimed in claim 30, wherein said second holes are arranged in a row.

42. A fastening device as claimed in claim 30, wherein said second holes are arranged in a row.

43. A fastening device as claimed in claim 30, wherein said second holes are key-shaped.

44. A fastening device as claimed in claim 43, wherein said edge portions define smaller portions of said key-shaped second holes.

45. A fastening device as claimed in claim 30, wherein said anchoring rail has a U-shaped profile.

46. A fastening device as claimed in claim 30, wherein said anchoring rail has a boxshaped profile.

47. A fastening device as claimed in claim 30, wherein said locking rail has a C-shaped profile.

48. A fastening device as claimed in claim 47, comprising two C-shaped locking rails having respective lateral webs and to be arranged in a profile of said anchoring rail with said respective lateral webs directed toward each other.

49. A fastening device as claimed in claim 30, further comprising an eccentric mounted on said anchoring rail and having an eccentric surface acting on said locking rail to generate displacement of said locking rail relative to said anchoring rail.

50. A fastening device as claimed in claim 30, wherein said locking rail has at least one spring to engage at least one fastening pin.

51. A fastening device as claimed in claim 30, wherein said anchoring rail has a lateral fastening web to be inserted into a groove in the article of furniture.

52. A fastening device as claimed in claim 30, wherein said anchoring rail has a lateral damping member.

53. A fastening device as claimed in claim 52, wherein said damping member is of plastic.

54. A fastening device as claimed in claim 52, wherein said damping member is of rubber.

55. A furniture fastening assembly comprising:

a plurality of furniture fittings including respective fastening pins having projections;

an anchoring rail to be fastened to an article of furniture, said anchoring rail having therein a plurality of first holes with said fastening pins received therein;

a locking rail complementary to said anchoring rail and displaceable relative thereto between an unlocking position and a locking position, said locking rail having therein a plurality of second holes with said fastening pins received therein, said locking rail having edge portions partially defining said second holes; and said fastening pins being selectively positionable over a length of said anchoring rail and a length of said locking rail, wherein when each said fastening pin is inserted through a respective said first hole and a corresponding second hole, said locking rail is displaceable to said locking position whereat said edge portions fit behind said projections and lock said furniture fittings in position relative to said anchoring rail.

56. A fastening device for connecting a plurality of furniture fittings including respective fastening pins having projections, said fastening device comprising:

an anchoring rail to be fastened to an article of furniture, said anchoring rail having therein a plurality of first holes which receive therein the fastening pins;

a locking rail complementary to said anchoring rail and displaceable relative thereto between an unlocking position and a locking position, said locking rail having therein a plurality of second holes which receive therein the fastening pins, said locking rail having edge portions partially defining said second holes; and the fastening pins being selectively positionable over a length of said anchoring rail and a length of said locking rail, wherein when each fastening pin is inserted through a respective said first hole and a corresponding second hole, said locking rail is displaceable to said locking position whereat said edge portions fit behind the projections and lock the furniture fittings in position relative to said anchoring rail.

* * * * *